United States Patent
Hartmann

(10) Patent No.: US 10,289,920 B2
(45) Date of Patent: May 14, 2019

(54) METHOD AND DEVICE FOR DETERMINING A ROADWAY STATE BY MEANS OF A VEHICLE CAMERA SYSTEM

(71) Applicant: Continental Teves AG & Co. oHG, Frankfurt (DE)

(72) Inventor: Bernd Hartmann, Bad Homburg (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 127 days.

(21) Appl. No.: 14/903,444

(22) PCT Filed: Oct. 28, 2014

(86) PCT No.: PCT/DE2014/200601
§ 371 (c)(1),
(2) Date: Jan. 7, 2016

(87) PCT Pub. No.: WO2015/070861
PCT Pub. Date: May 21, 2015

(65) Prior Publication Data
US 2016/0379065 A1    Dec. 29, 2016

(30) Foreign Application Priority Data
Nov. 15, 2013   (DE) .................. 10 2013 223 367

(51) Int. Cl.
*G06K 9/00*     (2006.01)
*B60R 11/04*    (2006.01)

(52) U.S. Cl.
CPC .......... *G06K 9/00798* (2013.01); *B60R 11/04* (2013.01); *G06K 9/00791* (2013.01)

(58) Field of Classification Search
None
See application file for complete search history.

(56) References Cited

U.S. PATENT DOCUMENTS

| 4,712,635 A | 12/1987 | Sumiya et al. |
| 5,351,192 A | 9/1994  | Tsuyama et al. |

(Continued)

FOREIGN PATENT DOCUMENTS

| DE | 198 56 510 | 9/1999 |
| DE | 198 54 964 | 6/2000 |

(Continued)

OTHER PUBLICATIONS

International Search Report of the International Searching Authority for International Application PCT/DE2014/200601, dated Mar. 26, 2015, 3 pages, European Patent Office, HV Rijswijk, Netherlands.

(Continued)

*Primary Examiner* — Kaitlin A Retallick
(74) *Attorney, Agent, or Firm* — W. F. Fasse

(57) ABSTRACT

A method and a device are for determining the presence and type of a roadway coating by a vehicle camera system. The vehicle camera system records at least one image of the surroundings of the subject vehicle. The at least one image is evaluated to detect indications of the presence of a roadway coating including a characteristic feature of the roadway coating that results as the roadway is traveled over by the subject vehicle or by another vehicle. The detected indications and characteristic feature are taken into consideration in the determination of the presence and type of a roadway coating. The result of the determination of the roadway coating, or a friction coefficient estimation derived therefrom, is output to a driver assistance function, a vehicle control function or as information to the driver.

17 Claims, 1 Drawing Sheet

(56) References Cited

U.S. PATENT DOCUMENTS

| | | | |
|---|---|---|---|
| 5,586,028 A | 12/1996 | Sekine et al. | |
| 5,774,821 A | 6/1998 | Eckert | |
| 5,944,392 A | 8/1999 | Tachihata et al. | |
| 5,963,148 A | 10/1999 | Sekine et al. | |
| 6,597,980 B2 | 7/2003 | Kogure | |
| 6,636,258 B2 | 10/2003 | Strumolo | |
| 6,807,473 B1 | 10/2004 | Tran | |
| 7,315,777 B2 | 1/2008 | Ono | |
| 7,411,488 B2 | 8/2008 | Gern et al. | |
| 7,702,446 B2 | 4/2010 | Hiwatashi | |
| 7,808,523 B2 | 10/2010 | Nishida et al. | |
| 8,180,527 B2 | 5/2012 | Mueller-Schneiders et al. | |
| 8,306,747 B1 | 11/2012 | Gagarin et al. | |
| 8,310,545 B2 | 11/2012 | Fujita et al. | |
| 8,666,562 B2 | 3/2014 | Tuononen | |
| 8,957,949 B2 | 2/2015 | Randler et al. | |
| 9,081,387 B2 | 7/2015 | Bretzigheimer et al. | |
| 2002/0007661 A1 | 1/2002 | Takahashi | |
| 2002/0087251 A1 | 7/2002 | Kogure et al. | |
| 2002/0176608 A1 | 11/2002 | Rose | |
| 2003/0101805 A1 | 6/2003 | Raab | |
| 2004/0016870 A1 | 1/2004 | Pawlicki et al. | |
| 2004/0138831 A1 | 7/2004 | Watanabe et al. | |
| 2004/0204812 A1* | 10/2004 | Tran | B60T 8/172 701/80 |
| 2005/0060069 A1* | 3/2005 | Breed | B60N 2/2863 701/408 |
| 2005/0085987 A1 | 4/2005 | Yokota et al. | |
| 2005/0172526 A1 | 8/2005 | Taylor et al. | |
| 2007/0050121 A1 | 3/2007 | Ammon et al. | |
| 2008/0027607 A1 | 1/2008 | Ertl et al. | |
| 2008/0110556 A1 | 5/2008 | Kawasaki | |
| 2010/0118116 A1 | 5/2010 | Tomasz et al. | |
| 2010/0253541 A1 | 10/2010 | Seder et al. | |
| 2010/0315505 A1 | 12/2010 | Michalke et al. | |
| 2011/0063097 A1 | 3/2011 | Naka et al. | |
| 2011/0200199 A1 | 8/2011 | Wakao | |
| 2011/0245995 A1 | 10/2011 | Schwarz | |
| 2012/0029783 A1 | 2/2012 | Takenaka et al. | |
| 2012/0078483 A1 | 3/2012 | Yajima et al. | |
| 2012/0167663 A1 | 7/2012 | Groitzsch et al. | |
| 2012/0323444 A1 | 12/2012 | Rieger et al. | |
| 2013/0013163 A1 | 1/2013 | Hong | |
| 2013/0033603 A1 | 2/2013 | Suzuki et al. | |
| 2013/0211720 A1* | 8/2013 | Niemz | G01C 21/20 701/538 |
| 2013/0332028 A1* | 12/2013 | Heger | B60Q 1/085 701/36 |
| 2013/0338878 A1 | 12/2013 | Fritz et al. | |
| 2014/0005875 A1 | 1/2014 | Hartmann et al. | |
| 2014/0052325 A1 | 2/2014 | Naegele et al. | |
| 2014/0195112 A1 | 7/2014 | Lu et al. | |
| 2014/0320644 A1 | 10/2014 | Hegemann et al. | |
| 2014/0347448 A1 | 11/2014 | Hegemann et al. | |
| 2015/0153266 A1 | 6/2015 | Mack | |
| 2015/0166072 A1 | 6/2015 | Powers et al. | |
| 2015/0178572 A1 | 6/2015 | Omer et al. | |
| 2015/0224925 A1 | 8/2015 | Hartmann | |
| 2015/0251659 A1 | 9/2015 | Fischer et al. | |
| 2015/0344037 A1 | 12/2015 | Siegel et al. | |
| 2015/0371095 A1 | 12/2015 | Hartmann et al. | |
| 2015/0375753 A1 | 12/2015 | Schräbler et al. | |
| 2016/0121902 A1 | 5/2016 | Huntzicker et al. | |

FOREIGN PATENT DOCUMENTS

| | | |
|---|---|---|
| DE | 101 55 488 | 5/2003 |
| DE | 102 56 726 | 6/2004 |
| DE | 102004018088 | 2/2005 |
| DE | 102004055069 | 2/2006 |
| DE | 102004047914 | 3/2006 |
| DE | 102004048637 | 4/2006 |
| DE | 102005039167 | 2/2007 |
| DE | 102006012289 | 9/2007 |
| DE | 102008047750 | 5/2009 |
| DE | 102010013339 | 1/2011 |
| DE | 102009041566 | 3/2011 |
| DE | 102010020688 | 5/2011 |
| DE | 102011100907 | 1/2012 |
| DE | 102010045162 | 3/2012 |
| DE | 102010063017 | 6/2012 |
| DE | 102011081362 | 2/2013 |
| DE | 102012221518 | 5/2014 |
| DE | 102016009928 | 2/2017 |
| EP | 0 412 791 | 2/1991 |
| EP | 0 827 127 | 3/1998 |
| EP | 1 201 521 | 5/2002 |
| EP | 2 048 476 | 4/2009 |
| EP | 2 521 111 | 11/2012 |
| JP | 07-035522 A | 2/1995 |
| JP | 11-211659 A | 8/1999 |
| JP | 11-223517 A | 8/1999 |
| JP | 2002-310896 A | 10/2002 |
| JP | 2005-162091 A | 6/2005 |
| JP | 2005-226671 A | 8/2005 |
| JP | 2007-322231 A | 12/2007 |
| JP | 2009-237938 A | 10/2009 |
| JP | 2013-014311 A | 1/2013 |
| JP | 2013-213793 A | 10/2013 |
| KR | 1020110032422 | 3/2011 |
| WO | WO 2004/021546 | 3/2004 |
| WO | WO 2012/110030 | 8/2012 |
| WO | WO 2013/007800 | 1/2013 |
| WO | WO 2013/009697 | 1/2013 |
| WO | WO 2013/117186 | 8/2013 |

OTHER PUBLICATIONS

PCT International Preliminary Report on Patentability including English Translation of PCT Written Opinion of the International Searching Authority for International Application PCT/DE2014/200601, dated May 17, 2016, 11 pages, International Bureau of WIPO, Geneva, Switzerland.

German Search Report for German Patent Application No. 10 2013 223 367.1, dated Sep. 12, 2014, 9 pages, Muenchen, Germany, with English translation, 6 pages.

Raqib Omer, "An Automatic Image Recognition System for Winter Road Surface Condition Monitoring", Master's Thesis, University of Waterloo, Ontario, Canada, Feb. 22, 2011, pp. i-xii, 1 to 68 retrieved at https://uwspace.uwaterloo.ca/handle/10012/5799, XP055177353A.

Maria Jokela et al., "Road Condition Monitoring System Based on a Stereo Camera", Intelligent Computer Communication and Processing, IEEE 5th International Conference ICCP 2009, Piscataway, NJ, USA, Aug. 27, 2009, XP031545069, pp. 423 to 428.

J. Chetan et al., "An Adaptive Outdoor Terrain Classification Methodology Using Monocular Camera", Intelligent Robots and Systems, IEEE International Conference IROS 2010, Piscataway, NJ, USA, Oct. 18, 2010, XP031920567, pp. 766 to 771.

J. H. Choi et al., "Road Identification in Monocular Color Images Using Random Forest and Color Correlogram", International Journal of Automotive Technology, vol. 13, No. 6, The Korean Society of Automotive Engineers, Heidelberg, Oct. 2, 2012, XP035120063, pp. 941 to 948.

Raqib Omer et al., "An Automatic Image Recognition System for Winter Road Surface Condition Classification", Intelligent Transportation Systems, 13th International IEEE Conference ITSC 2010, Piscataway, NJ, USA, Sep. 19, 2010, XP031792816, pp. 1375 to 1379.

T. Teshima et al., "Detection of the Wet Area of the Road Surface Based on a Saturated Reflection", Meeting on Image Recognition and Understanding, 2007, XP002730931, pp. 1218 to 1223, retrieved at http://hvrl.ics.keio.ac.jp/paper/pdf/domestic_Conference/2007/MIRU2007_teshima.pdf.

Ernst Dieter Dickmanns et al., "Dynamic Monocular Machine Vision", Machine Vision and Applications, 1988 Springer-Verlag New York Inc., pp. 223 to 240.

(56) References Cited

OTHER PUBLICATIONS

Partial English translation of Japanese Office Action in Japanese Patent Application No. 2016-553707, dated Aug. 15, 2018, 7 pages.
Wang et al., "Study on Curb Detection Method Based on 3D Range Image by Laser Radar", 2005 IEEE Intelligent Vehicles Symposium, pp. 845-846.
Wijesoma et al., "Road-Boundary Detection and Tracking Using Ladar Sensing", IEEE Transactions on Robotics and Automation, vol. 20, No. 3, Jun. 2004, pp. 456-464.
Siegemund et al., "Curb Reconstruction Using Conditional Random Fields", 2010 IEEE Intelligent Vehicles Symposium, University of California, San Diego, CA, USA, Jun. 21-24, 2010, pp. 203-210.
Oniga et al., "Polynomial Curb Detection Based on Dense Stereovision for Driving Assistance", 2010 13$^{th}$ International IEEE Annual Conference on Intelligent Transportation Systems, Madeira Island, Portugal, Sep. 19-22, 2010, pp. 1110-1115.

\* cited by examiner

METHOD AND DEVICE FOR DETERMINING A ROADWAY STATE BY MEANS OF A VEHICLE CAMERA SYSTEM

FIELD OF THE INVENTION

The invention relates to a method and a device for determining a roadway coating by means of a vehicle camera system.

BACKGROUND INFORMATION

Driver assistance systems support the driver in his driving task and are thus helping to make road traffic safer in future and to reduce accident figures. Camera-based driver assistance systems hereby detect the surroundings of a vehicle. Camera systems which are located behind the windshield detect the area in front of the vehicle according to the driver's visual perception. The functional scopes of such assistance systems extend from intelligent headlamp control to detecting and displaying speed limits to warnings in the event of the vehicle failing to keep to its lane or an impending collision. In addition to camera systems, radar sensors, lidar sensors and/or laser scanners help to detect other vehicles, unprotected road users such as e.g. pedestrians and cyclists and the infrastructure such as e.g. crash barriers and traffic lights. This is therefore creating the requirement to depict the immediate vehicle environment more and more accurately.

The degree of automation of motor vehicles will continue to rise in future. As a result, the level of equipping of vehicles with sensor technology will also increase very significantly. Highly or fully automated vehicles will be equipped with a plurality of different sensors and will thus allow a 360° view, in particular via camera systems.

An essential part of a driver's driving task is correctly assessing the roadway state and, thus, the available friction coefficient between tires and the roadway, in order to then adapt his driving style accordingly. In future, highly and fully automated vehicles will take over the task of driving at least in partial areas. To this end, it is essential for the roadway state to be correctly detected and assessed by the system.

DE 10 2004 018 088 A1 shows a roadway detection system having a temperature sensor, an ultrasonic sensor and a camera. The temperature, roughness and image data (roadway data) obtained from the sensors is filtered and compared with reference data, and a level of security is generated for the comparison. The state of the roadway surface is detected on the basis of the comparison of the filtered roadway data with the reference data. The roadway surface (e.g. concrete, asphalt, dirt, grass, sand or gravel) and the state thereof (e.g. dry, icy, snowy, wet) can be classified in this way.

WO 2012/110030 A2 shows a method and a device for estimating coefficients of friction using a 3D camera, e.g. a stereo camera. At least one image of the environment of the vehicle is recorded by means of the 3D camera. A height profile of the road surface is created in the entire area in front of the vehicle from the image data of the 3D camera. The anticipated local coefficient of friction of the road surface in the area in front of the vehicle is estimated from the height profile. In individual cases, the roadway surface can be classified, e.g. as a blanket of snow or a muddy dirt track, from special detected height profiles.

WO 2013/117186 A1 shows a method and a device for detecting the condition of a roadway surface by means of a 3D camera. By means of the 3D camera, at least one image of the surroundings extending in front of the vehicle is acquired. Height profiles of the roadway surface which extend transversely to the direction of motion of the vehicle are determined from the image data of the 3D camera along a plurality of lines. The condition of the roadway surface is detected from the determined height profiles. In addition to the determined height profiles, 2D image data from at least one monocular camera of the 3D camera is optionally evaluated, e.g. by means of a texture or pattern analysis, and is incorporated into the detection of the condition of the roadway surface.

However, the known methods place high demands on the required sensor technology. Therefore, in the case of the indicated methods and/or devices, either a temperature and ultrasonic sensor are required in addition to a camera, or the camera must be configured as a 3D sensor, so that the classification results are sufficiently robust.

SUMMARY OF THE INVENTION

An object of an embodiment of this invention is therefore to indicate a roadway state determination by means of a camera which, when different vehicle camera system configurations are used, including, for example, just one mono camera system, makes possible an optimized roadway state detection and friction coefficient estimation derived therefrom.

One of the main ideas of the invention is to specifically detect indications of the existence of a roadway coating as the roadway is traveled over by a vehicle by means of a camera system and image processing. A roadway coating is e.g. snow, rainwater, ice, leaves, dust, i.e. media/objects which lie flat (blanket, carpet) on the roadway surface (asphalt, tar, concrete, etc.). The phenomenon of lying flat on the roadway surface can be described as a blanket or carpet of the medium or of the objects, however the entire roadway surface does not have to be covered. Different roadway coatings typically show different behaviors when they are traveled over by a vehicle. Some of them can be observed and/or detected with a camera and recognized and/or identified in a subsequent evaluation of the image, from which conclusions regarding the presence and the nature of the roadway coating can be drawn.

A method for determining a roadway coating by means of a vehicle camera system according to the invention comprises the following steps: by means of the vehicle camera system, at least one image of the surroundings of the vehicle is recorded. The at least one image is evaluated in order to detect indications of the presence of a roadway coating as the roadway is traveled over by the vehicle with the vehicle camera system or by another vehicle. The detected indications are taken into consideration in the determination of a roadway coating. The result of the determination of the roadway coating can preferably be combined with a direct roadway state detection by means of a classification or an application of a neural network and output to a driver assistance function, to a vehicle control function or also as information to the driver. Driver assistance functions can in particular comprise collision warnings, emergency braking applications or even emergency steering, whilst vehicle control functions can in particular comprise occupant protection measures (airbag anticipatory control, brake anticipatory control, belt tensioner anticipatory control) as well as (partially) autonomous braking and/or steering interventions. In a preferred use of the method according to the invention, the detected indications and/or the result of the determination of the roadway coating are taken into consideration in the design of driver assistance functions and vehicle control functions.

The result of the determination of the roadway coating can in particular be incorporated into an estimate of the friction coefficient for the roadway area which is shown in the image, or a current friction coefficient which is otherwise detected or a predictively detected friction coefficient. This is because the roadway coating has a significant influence on the actual friction coefficient. The friction coefficient, also known as the friction value, adhesion coefficient, (adhesive) friction coefficient or coefficient of friction indicates the maximum force with reference to the wheel load which can be transmitted between a roadway surface and a vehicle tire (e.g. in the tangential direction) and is thus an essential measure of driving safety. In addition to the roadway state, the properties of the tire are required in order to determine the friction value completely.

According to an advantageous embodiment, the effects of precipitation (for example rain, snow, hail or even fog) in the image, on the roadway and on the vehicles or vehicle windshields are detected as indications during the evaluation of the image.

The type and quantity of precipitation can be determined during the evaluation of the image. The detection direction of the camera system can hereby be advantageously linked with the current direction of motion of the vehicle. Thus, when heavy rainfall is detected by a front camera, it can be concluded during the evaluation of the image that the roadway in front of the vehicle will be wet.

In a preferred embodiment, effects of a roadway coating as it is traveled over by at least one tire of a vehicle are detected as indications during the evaluation of the image. Effects are hereby in particular modifications of the roadway surface including the roadway coating as it is traveled over by a vehicle or, more precisely, as it is traveled over by at least one tire of the vehicle.

At least one region in the at least one image is advantageously determined, from which indications of the presence of a roadway coating are to be inferred. These are in particular image regions which include a vehicle tire travelling over said roadway coating or which are located adjacent to (at the side of or behind) such a vehicle tire.

The region in the at least one image is preferably supplied to a classifier which maps the detected indications onto a quantity of classes which are each assigned to one roadway coating.

According to an advantageous embodiment, the vehicle camera system has a rear and/or lateral detection area of the surroundings of the host vehicle. The host vehicle is hereby the vehicle which has the vehicle camera system. In this way, indications of the presence of a roadway coating as the roadway is traveled over by the host vehicle can be detected during the evaluation of the image. The evaluation of the image can, in the process, advantageously be limited to a fixed image region, in which effects of an existing roadway coating are typically shown, therefore e.g. a region behind a tire or at the back of the host vehicle which is shown by a rear camera or a region adjacent to a tire of the host vehicle which is shown by a side camera.

The advantage with this embodiment is that, in order to determine a roadway coating, the driver is not dependent on other vehicles located in the detection area of the vehicle camera system.

In a preferred embodiment, the vehicle camera system has a detection area located in front of the host vehicle, so that indications of the presence of a roadway coating as the roadway is traveled over by a vehicle travelling in front, a vehicle travelling on a road which intersects with the road on which the host vehicle is travelling or an oncoming vehicle are detected during the evaluation of the image.

To that end, the evaluation of the image may, in particular, be limited to an image region in which the back and/or the side of a vehicle travelling in front or the vehicle front and/or the side of an oncoming vehicle is/are shown. The relevant image region can preferably be determined on the basis of the tire contact zones with the roadway in the image.

One advantage of this embodiment is that a predictive determination of a roadway coating is possible.

The indications of the presence of a roadway coating as the roadway is traveled over advantageously comprise whirled-up components of the roadway coating. These include in particular the detection of spray water or sprayed slush, spray mist or spray, snow turbulence, leaves as well as sand or dust.

According to a preferred embodiment, the indications of the presence of a roadway coating comprise obstructed views in the field of view of the vehicle camera system due to the roadway being traveled over by a vehicle travelling in front, a vehicle travelling on a road which intersects with the road on which the host vehicle is travelling or an oncoming vehicle.

The indications of the presence of a roadway coating as the roadway is traveled over by a vehicle preferably comprise tire ruts in the roadway coating. In the case of special roadway coatings, tire ruts are formed directly behind the tires of a moving vehicle, sometimes the impression of the tire profile can even be detected within a tire rut e.g. in the case of a coating of snow.

During the determination of the presence of a roadway coating, in addition to the indications of the presence of a roadway coating as the roadway is traveled over by a vehicle, typical generic properties of different roadway coatings can, in addition, advantageously be detected and taken into consideration. This means properties which are characteristic of roadway coatings and which can be recognized from a camera image even without a vehicle travelling over the roadway surface, e.g. puddles and reflections in the case of rainwater or the topology of the surface. In particular, headlights of oncoming vehicles are reflected more strongly on a rain-wet or icy roadway than on a dry roadway.

The classifier preferably comprises a neural network which has been trained, in order to be able to assign the detected indications to a roadway coating. The neural network can in particular also continually learn to assign indications to a class of roadway coatings.

According to an advantageous further development of the invention, the result of the determination of the roadway coating is combined with the result of a roadway state detection or classification and the friction coefficient is estimated therefrom. In particular, the roadway state detection or classification determines the material and geometric roadway surface e.g. rough or smooth tar, asphalt or concrete, possibly with existing ruts, and can in particular be based on image data from the same vehicle camera system.

The invention additionally relates to a device for determining a roadway coating comprising a vehicle camera system, an evaluating unit, a determining unit and an output unit. The vehicle camera system is configured to record at least one image of the surroundings of the vehicle. The evaluating unit is configured to evaluate the at least one image, in order to detect indications of the presence of a roadway coating by precipitation and/or as the roadway is traveled over by a vehicle (E, F). The determining unit is configured to determine a roadway coating taking into consideration the detected indications. The output unit is set up to output the result detected by the determining unit. The evaluating, determining and output units can in particular be part of the control unit of the vehicle camera system or of other vehicle control units.

BRIEF DESCRIPTION OF THE DRAWINGS

The invention will be explained in more detail below by means of figures and embodiment examples, where.

DETAILED DESCRIPTION OF EXAMPLE EMBODIMENTS OF THE INVENTION

Figure 1:
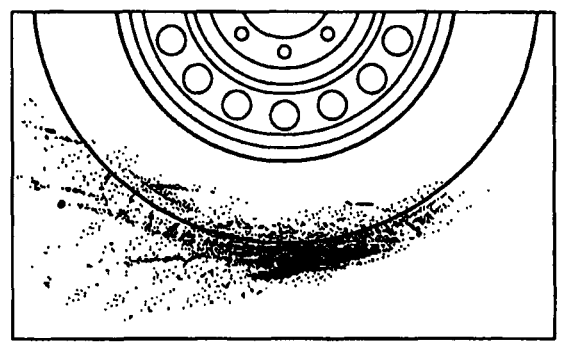
FIG. 1 schematically shows a binary camera image of a vehicle tire as a rain-wet roadway is traveled over.

FIG. 1 shows a black and white illustration of a camera image of a vehicle tire traveling over a rain-wet roadway. The vehicle tire is mounted on a wheel rim (white with black outlines, circular) and the vehicle moves to the right. Water drops and streams of water (black dots and streams) can be seen, which are displaced and accelerated as the tire travels over the roadway surface covered with water. Spray water is of course formed, starting from the vehicle tire, as wet roads are traveled over. Due to the high surface pressure, the tire displaces the standing water on the roadway on all sides. The phenomenon is particularly pronounced with trucks, the tires of which have a correspondingly higher surface pressure and must displace more water than cars. Looking in the direction of travel, the spray water is mainly located behind and laterally adjacent to the vehicle tire. It can be detected there by a vehicle camera and recognized as spray water by image processing, from which it can be concluded that a layer of rainwater is coating the roadway.

If slush is present on the roadway, spraying slush is produced in a comparable way, which can be detected and recognized as such. Depending on the roadway coating, e.g. in the case of a damp instead of a wet roadway, and depending on the structure of the roadway surface, no spray water will be produced as the road coating is traveled over, instead only spray mist or spray or both will be produced. This can also be detected by a vehicle camera and can be recognized by image processing as spray mist or spray.

When roads covered with new snow or powder snow are traveled over, typical snow turbulence occurs, which spreads to the sides of the vehicle and, as a light covering of snow, to the rear of the vehicle. Other roadway coatings such as e.g. a layer of leaves or a sandy surface on a paved roadway are also whirled up when they are traveled over and can be detected and recognized with a vehicle camera.

In addition, in the case of some roadway coatings, additional indications in the camera image can be detected and identified. Thus, as wet or snow-covered roadways are traveled over or as slush is also traveled over, tire ruts are formed behind a moving vehicle, sometimes the impression of the tire profile within a tire rut can even be detected e.g. when there is a thin layer of snow. In addition, precipitation in the form of rain, snow or hail, and even fog, can be detected as indications of the roadway state in the camera image.

Different indications of the existence of a roadway coating detected from camera images are therefore advantageously taken into consideration in the classification of the nature of the roadway coating.

The different classes can be coarsely divided (no roadway coating/water/snow), but can also be more finely divided (e.g. in the case of snow: powder snow up to 5 mm high, powder snow >5 mm high, solid snow, slush). This subdivision can in particular be made as a function of an assignment of the class to an average friction coefficient, and/or the change of the assigned average friction coefficient during the transition from one subclass to another.

Figure 2:
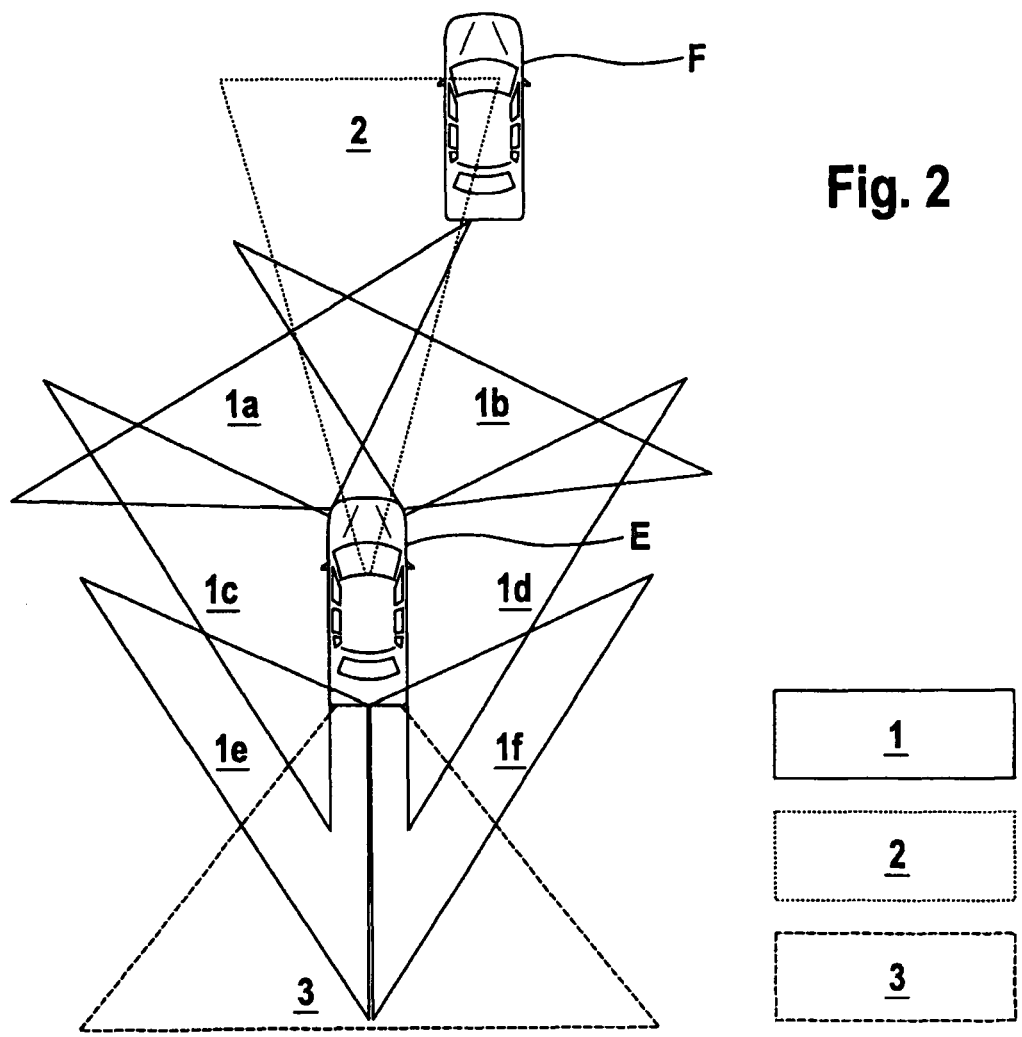
FIG. 2 shows different detection areas of a complex camera system of a vehicle.

FIG. 2 shows the detection areas ($1a$-$1f$, 2, 3) of a camera system arranged in or on a first vehicle (E). A second vehicle (F) is located laterally offset in front of the first vehicle (E) in the direction of travel. The camera system of the first vehicle (E) comprises three different camera subsystems (1, 2 and 3): a panoramic view system (1) comprising six individual camera sensors with wide-angle detection areas ($1a$-$1f$) which, together, allow 360° detection of the vehicle, a front camera with a forward-facing detection area (2) and a rear camera with a rear-facing detection area (3).

Indications of the presence of a roadway coating as the roadway is traveled over by vehicles travelling in front of the host vehicle (F) or by oncoming vehicles (not shown) can be detected with camera sensors which comprise a forward-facing detection area ($1a$, $1b$, 2) in the direction of travel. This offers the advantage of a predictive determination of the roadway coating. A stereo camera can preferably be used as a front camera, as a result of which a spatial resolution of the recorded image data is achieved. Objects such as e.g. spray water drops can be analyzed with respect to their spatial form and extent, which improves the classification of an existing roadway coating.

The image processing for determining a roadway coating can be advantageously limited to one or more regions of the camera image, in which a tire contact zone of the roadway is located.

In the case of a vehicle travelling in front (F) an image region can be evaluated, in which the rear of the vehicle of the vehicle travelling in front is located.

Indications of the presence of a roadway coating as the roadway is traveled over by the tires of the host vehicle (E) can be detected with camera sensors, which comprise a detection area (3, $1e$, $1f$, $1c$, $1d$) facing backwards or to the side in the direction of travel.

The advantage with this is that the driver is not dependent on other vehicles (F) travelling in front or offset but, thanks to the detection and determination of the effects caused by the host vehicle (E) by means of rear and/or laterally oriented sensor technology, can determine a currently relevant roadway coating, independently of other vehicles (F). Since vehicles will in future be increasingly equipped with 360° camera sensor technology which records a surround view which can be displayed to the driver e.g. as a "top view" in a bird's eye view, the reliable determination of a roadway coating is realistic.

The invention claimed is:

1. A method of determining a roadway coating on a roadway with a vehicle camera system of a subject vehicle, wherein the roadway coating is formed by extraneous media or objects lying on the roadway, wherein plural different types of roadway coatings respectively exhibit different characteristic features when driven over by the subject vehicle or another vehicle, wherein the plural different types of roadway coatings comprise snow, water, slush, ice, leaves, and sand, and wherein the method comprises:

with the vehicle camera system, recording camera images of surroundings of the subject vehicle including at least one camera image of the roadway coating on the roadway, which exhibits an actual characteristic feature resulting from the roadway coating being driven over by the subject vehicle or the another vehicle;

evaluating at least a partial region of the at least one camera image by image processing to detect, from only the at least one camera image, indications of a presence of the roadway coating including the actual characteristic feature of the roadway coating as the roadway is driven over by the subject vehicle or by the another vehicle;

determining the presence of the roadway coating on the roadway and making a conclusion about a type of the roadway coating among the plural different types of roadway coatings in consideration of and dependent on only the indications including the actual characteristic feature that were detected from only the at least one camera image, and outputting a result of the determining of the presence and the conclusion about the type of the roadway coating.

2. The method according to claim 1, wherein the extraneous media which forms the roadway coating comprises precipitation lying on the roadway, and wherein the indications of the presence of the roadway coating detected from only the at least one camera image further comprise effects of the precipitation on the roadway, on the subject vehicle, on the another vehicle, or on a vehicle windshield of the subject vehicle or of the another vehicle.

3. The method according to claim 1, wherein the actual characteristic feature comprises effects on the roadway coating as it is traveled over by at least one tire of the subject vehicle or of the another vehicle, which effects are detected in the evaluating of the at least one camera image.

4. The method according to claim 1, further comprising determining at least one selected partial region in the at least one camera image, and limiting the evaluating of the at least one camera image to only the at least one selected partial region thereof so as to detect the indications of the presence of the roadway coating only from the at least one selected partial region of the camera image.

5. The method according to claim 1, wherein the making of the conclusion is performed by a classifier which maps the detected actual characteristic feature onto a plurality of classes characterized by the different characteristic features which are respectively assigned to the plural different types of roadway coatings.

6. The method according to claim 1, wherein the vehicle camera system has a rear and/or lateral detection area of the surroundings located behind and/or beside the subject vehicle so that the indications of the presence of the roadway coating including the actual characteristic feature exhibited by the roadway coating as the roadway is traveled over by the subject vehicle are detected in the evaluating of the at least one camera image.

7. The method according to claim 1, wherein the vehicle camera system has a forward detection area of the surroundings located in front of the subject vehicle so that the indications of the presence of the roadway coating including the actual characteristic feature exhibited by the roadway coating as the roadway is traveled over by the another vehicle are detected in the evaluating of the at least one camera image, wherein the another vehicle comprises a leading vehicle traveling in front of the subject vehicle, an oncoming vehicle traveling opposite the subject vehicle, or a crossing vehicle traveling on a roadway path that intersects a roadway path of the roadway on which the subject vehicle is traveling.

8. The method according to claim 1, wherein the actual characteristic feature of the roadway coating comprises whirled-up components of the roadway coating which are detectable at least in the partial region of the at least one camera image in the evaluating thereof.

9. The method according to claim 1, wherein the indications of the presence of the roadway coating detected from only the at least one camera image further comprise obstructed views in a field of view of the vehicle camera system because the roadway is being traveled over by the another vehicle, which comprises a leading vehicle traveling in front of the subject vehicle, an oncoming vehicle traveling opposite the subject vehicle, or a crossing vehicle traveling on a roadway path that intersects a roadway path of the roadway on which the subject vehicle is traveling.

10. The method according to claim 1, wherein the actual characteristic feature of the roadway coating comprises tire ruts in the roadway coating which are detectable at least in the partial region of the at least one camera image in the evaluating thereof.

11. The method according to claim 5, wherein the classifier comprises a neural network that has been trained to be able to assign the detected actual characteristic feature to a specific matching one of the different characteristic features of the plural different types of roadway coatings.

12. The method according to claim 1, further comprising performing a roadway state detection or classification of the roadway, combining the result of the determining of the presence of the roadway coating with a result of the roadway state detection or classification, and estimating a friction coefficient of the roadway from the combined results.

13. A device for determining a roadway coating on a roadway, wherein the roadway coating is formed by extraneous media or objects lying on the roadway, wherein plural different types of roadway coatings respectively exhibit different characteristic features when driven over by a subject vehicle or another vehicle, wherein the plural different types of roadway coatings comprise snow, water, slush, ice, leaves, and sand, and wherein the device comprises:

a vehicle camera system on the subject vehicle, which vehicle camera system is configured to record camera images of surroundings of the subject vehicle including at least one camera image of the roadway coating on the roadway, which exhibits an actual characteristic feature resulting from the roadway coating being driven over by the subject vehicle or the another vehicle, an evaluating unit which is configured to evaluate at least a partial region of the at least one camera image by image processing to detect, from only the at least one camera image, indications of a presence of the roadway coating including the actual characteristic feature of the roadway coating as the roadway is driven over by the subject vehicle or by the another vehicle, a determining unit which is configured to determine the presence of the roadway coating on the roadway and to make a conclusion about a type of the roadway coating among the plural different types of roadway coatings in consideration of and dependent on only the indications including the actual characteristic feature that were detected from only the at least one camera image, and an output unit which is configured to output a result of the determining of the presence and the conclusion about the type of the roadway coating.

14. A method for a driver assistance system of a subject vehicle, comprising the following steps performed by the driver assistance system:

a) with a camera system of the subject vehicle recording surroundings of the subject vehicle and producing corresponding camera image data including at least one camera image of a roadway coating on a roadway, wherein the roadway coating is formed by extraneous media or objects lying on the roadway, and wherein the roadway coating exhibits a characteristic feature resulting from being driven over by the subject vehicle or another vehicle;

b) evaluating at least a partial region of the at least one camera image by image processing to detect, from only the at least one camera image, indications of a presence of the roadway coating including the characteristic feature of the roadway coating;

c) classifying the characteristic feature, which has been detected from only the at least one camera image, among pre-determined plural different characteristic features that are respectively exhibited by plural different types of roadway coatings as a result of being driven over, wherein the plural different types of roadway coatings comprise snow, water, slush, ice, leaves, and sand;

d) based on a result of the classifying, making a conclusion about a type of the roadway coating on the roadway among the plural different types of roadway coatings; and e) outputting the conclusion about the type of the roadway coating.

15. The method according to claim 14, wherein the classifying of the characteristic feature and the making of the conclusion are based on only the camera image data, without consideration of temperature sensor data and without consideration of ultrasonic sensor data.

16. The method according to claim 14, wherein the plural different characteristic features comprise whirled-up or sprayed components of the extraneous media or objects that form the roadway coating, which whirled-up or sprayed components are whirled-up or sprayed into the air above the roadway when the roadway coating is driven over by the vehicle, wherein the whirled-up or sprayed components are selected from the group consisting of water spray, slush spray, snow spray, spray mist, whirled-up water, whirled-up snow, sprayed snow, whirled-up leaves, sprayed leaves, whirled-up sand, sprayed sand, whirled-up dust, and sprayed dust.

17. The method according to claim 14, wherein the camera system comprises a camera with a detection zone of the camera directed to a rear area behind the subject vehicle or a lateral area to a side of the subject vehicle, wherein the characteristic feature exhibited by the roadway coating is a characteristic feature resulting from being driven over by the subject vehicle, and wherein the plural different characteristic features respectively exhibited by the plural different roadway coatings are characteristic features resulting from being driven over by the subject vehicle.

* * * * *